Aug. 31, 1937.   M. MALLORY   2,091,413
INTERNAL COMBUSTION ENGINE
Filed July 22, 1936
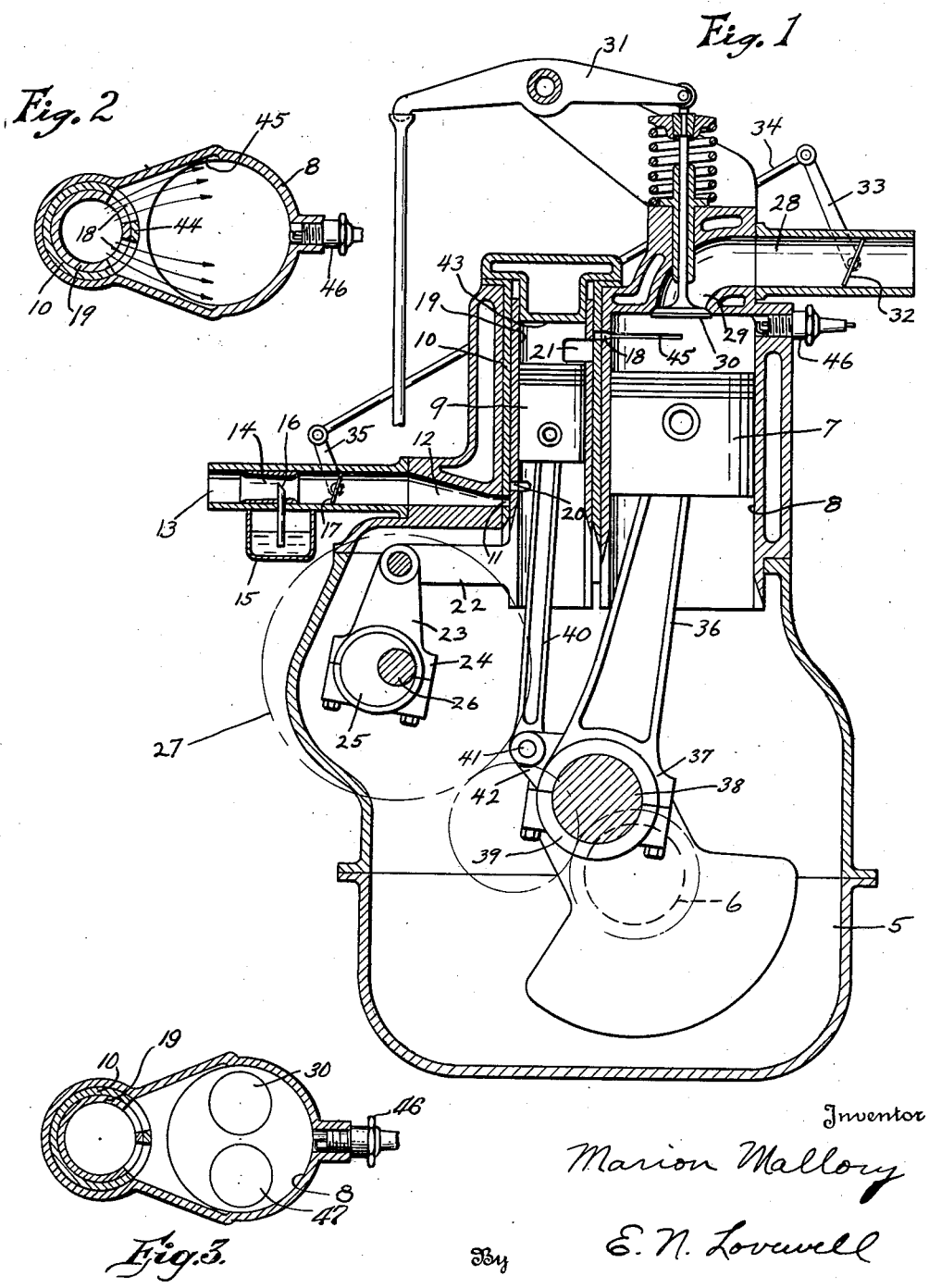

Patented Aug. 31, 1937

2,091,413

UNITED STATES PATENT OFFICE 2,091,413

INTERNAL COMBUSTION ENGINE

Marion Mallory, Detroit, Mich.

Application July 22, 1936, Serial No. 91,984

12 Claims. (Cl. 123—53)

This invention relates to internal combustion engines in which a rich mixture consisting of fuel and air is injected under comparatively high pressure into a cylinder containing air and then electrically ignited.

For engines having cylinders with low cubic inch displacement, a solid liquid fuel injection cannot be used, because it is practically impossible to make an injector having holes small enough to deliver the extremely small charge required. It has been proposed, therefore, to inject a rich primary mixture of air and fuel into a cylinder filled with air or lean mixture, but this has not been satisfactory because the cylinder and piston used to compress this rich mixture was not used to develop power by the explosion. Consequently, the power untilized to compress the mixture reduced the engine power. Another reason why engines using a small cylinder and a small piston to force a compressed charge of air and fuel into a large cylinder have not been satisfactory is due to the timing of the valve that opens the communication between the small and the large cylinder. For example; if both of the pistons were not used for power, it would be practically impossible to time the valve or communication between the two cylinders so that it would open and close in short enough periods to maintain proper timing, of either the valve or the ignition.

One of the objects of the present invention is to inject into the main power cylinder a rich mixture of greater volume than heretofore used, which mixture is completely atomized and homogeneous under all operating conditions. This charge is injected from a small cylinder, whose piston leads the piston in the main cylinder and develops a much higher compression. The injected charge, being of smaller volume, is supplied from a small carburetor. The admittance of the rich mixture to the small cylinder is delayed until near the end of the intake stroke, so that a high vacuum is built up in the small cylinder, thus developing a very high velocity through the venturi and past the fuel nozzle and insuring complete atomization.

Another object of the invention is to create a high turbulence just preceding and during the occurrence of the spark, so that the mixture will be readily ignited and complete combustion will take place. It will be understood that the communication between the small cylinder and the large cylinder is closed during the intake stroke and during the greater part of the compression stroke. When the small piston nearly reaches its maximum compression, communication between the two cylinders is opened. This promotes a violent spray of the rich mixture into the large cylinder because, at this time, the compression in the large cylinder is much less than in the small one. During this high turbulence, the spark occurs.

A still further object is to utilize the displacement of the small injection cylinder for power, thereby eliminating any power loss to the engine. The engine is operated about 80% or 90% on a cold charge, which is admitted to the main cylinder through an independent inlet and into which the rich fuel mixture is injected as above described. Nevertheless, the spark occurs in the midst of the injected mixture while it is in a highly turbulent state, so that low grade fuel, such as oil, may be used with assurance that it will be easily and completely burned.

The above and other objects and advantages of the invention will be particularly explained in connection with the accompanying drawing, in which,—

Figure 1 is a vertical sectional view taken through one of the power units of the engine and the means for charging the same, the compression stroke being nearly completed.

Figure 2 is a horizontal section through the two cylinders of a power unit, showing the communicating port between them.

Fig. 3 is a section taken on the same plane as Fig. 2, but looking in the opposite direction.

As shown in the drawing, the engine to which the invention pertains comprises a crank case 5, within which the crank shaft 6 is mounted. Each power unit comprises a main power piston 7, reciprocable in the cylinder 8, and a smaller piston 9, which is primarily an injector, reciprocable in the cylinder 10. The engine may have any number of these power units, corresponding to the number of cylinders in a conventional engine, but since these units are all alike, it has been deemed necessary to show only one.

The cylinder 10 has a fuel mixture inlet port 11 near its lower end, to which fuel mixture is supplied from a manifold 12. An air inlet 13 leads through a venturi 14 to the manifold 12 and a small carburetor 15 supplies fuel thereto through a jet opening or nozzle 16 located in the venturi. A throttle valve 17 is located between the venturi 14 and the manifold 12. Normally, the carburetor is adjusted to supply a rich mixture to the inlet 11.

There is a port 18 between the two cylinders 8 and 10. This port is closed, during all of the intake stroke and the greater part of the compression stroke, by a sleeve valve 19, which encircles the piston 9 within the cylinder 10. This sleeve valve also closes the port 11 all the time except during the latter part of the intake stroke.

The sleeve valve 19 has a port 20 which registers with the port 11 as the piston 7 approaches the end of the intake stroke, allowing the rich fuel mixture charge to rush into the cylinder 8. It also has a port 21 which registers with the port 18 toward the end of the compression stroke, whereupon the charge, then under high pressure, is injected into the cylinder 10.

For operating the sleeve valve 19 in this manner, an arm 22, projecting from the lower end of the valve, is connected to a connecting rod 23, which has a bearing 24 on an eccentric 25 formed on the cam shaft 26, the latter being driven from the crank shaft 6, at half the speed of said shaft, by gearing shown diagrammatically at 27.

A charge of air is admitted to the main cylinder 8 from a manifold 28 through a port 29, in which is an inlet valve 30, controlled in the usual manner from the cam shaft through a rocker arm 31. It will also be understood that the exhaust from the cylinder 8 is effected in the usual manner by opening the exhaust valve 47.

The injection cylinder 10 also operates as a power cylinder, in conjunction with the cylinder 8. The port 18 remains open during the power and exhaust strokes and the cylinder 10 is exhausted through the cylinder 8.

The volume of air admitted to the cylinder 8 is controlled, in synchronism with the volume of the charge admitted to the cylinder 10, by a throttle valve 32, the arm 33 of which is connected by a rod 34 to the arm 35 of the throttle valve 17.

The main power piston 7 has a connecting rod 36 formed with a bearing member 37 on the crank pin 38 of the shaft 6. This bearing member has a cap 39 secured by bolts or the like. The injection piston 9 has a connecting rod 40 connected to a pin 41 mounted in an extension 42 of the bearing member 37.

It will be seen, therefore, that the injection piston 9 leads the main power piston 7. Also, the head 43 of the cylinder 10 is lower than the head of the cylinder 8, so that as the piston 9 approaches the end of its compression stroke, as shown in Figure 1, the compression in the cylinder 10 is much higher than the compression in the cylinder 8. As the port 18 is opened, therefore, an intense spray of rich, completely atomized mixture is injected into the cylinder 8.

Preferably, the port 18 is divided centrally by a web 44, as shown in Figure 2, so that the injection is in two divergent sprays. The port increases in width and decreases in thickness as it enters the cylinder 8, and the wall of the latter is grooved, as at 45, so that these divergent sprays flow around opposite sides of the cylinder and cause intense turbulence, particularly in the vicinity of the spark plug 46, which is located on the opposite side of the cylinder. The spark occurs at the time of greatest turbulence and insures perfect ignition.

In the operation of the engine, both ports 11 and 18 are closed by the sleeve valve 19, as stated above, during the greater part of the intake stroke. As the piston 9 approaches the lower end of its cylinder on the intake stroke, the valve 19 approaches its lowermost position. This opens the port 11, while the port 18 remains closed, and the high vacuum in the cylinder 10 quickly draws in a charge of fuel mixture from the carburetor 15. The latter is adjusted for a rich mixture and, since the mixture is drawn into the cylinder at a very high velocity, it is completely atomized. Meanwhile, the cam shaft has caused the rocker arm 31 to open the valve 30 and the cylinder 8 has been filled with air. As soon as the mixture is drawn into the cylinder 10, the port 11 is closed and the mixture is immediately compressed by the piston 9.

As the piston 9 approaches the position of maximum compression, the valve 19, in response to the half-speed rotation of the eccentric 25, opens the port 18. As above stated, the piston 9 leads the piston 7 and the compression in the cylinder 10 at this time is much higher than in the cylinder 8. Since the throttle valves 17 and 32 always operate in synchronism, the relative intake and relative compression in the two cylinders is always the same. As soon as the port 18 is opened, there is an immediate surge of rich mixture into the cylinder 8, to and around the spark plug 46, where it is in a highly turbulent state. At this time, as the large piston approaches top dead center, the spark takes place.

The port 21 is wide enough, with the valve 19 controlled by the eccentric 25 rotating at half-speed, so that the port 18 remains open during the power and exhaust strokes. The cylinder 10, therefore, functions as a power cylinder, as well as an injection cylinder, and is exhausted through the cylinder 8.

At the end of the exhaust stroke, the valve 19 closes the communication through port 18 between the two cylinders. This port then remains closed during the intake stroke and the greater part of the compression stroke. The port 11 is never open except during the latter part of the intake stroke.

Even when a low grade of fuel is used in this engine, it will be easily ignited, because the primary mixture enters the injection cylinder at a high velocity, whereby it is thoroughly mixed and atomized; it is then immediately compressed and injected into the main cylinder, also at a high velocity; and the spark occurs in the midst of this injected mixture, while it is in an intensely turbulent state. It is also very economical in the consumption of fuel, because a high percentage of the charge in the main cylinder consists of cold air admitted from the manifold 28.

It will be understood that the details of construction herein shown and described are merely illustrative and that the invention also embraces all such modifications as may be made within the scope of the appended claims.

Having thus described the invention, what I claim as new and desire to secure by Letters Patent, is:—

1. An internal combustion engine comprising a crank shaft, a main power cylinder, an injection cylinder having an intake port and a discharge port into the main power cylinder, pistons for the respective cylinders operatively connected to said crank shaft, a spark plug in the main power cylinder opposite the communication port, means for charging the main power cylinder with air, means for supplying a rich fuel mixture to said intake port, means for closing said intake port except when the injection piston is near the end of its intake stroke, and means for closing said communication port during the entire intake stroke and the greater part of the compression stroke, leaving it open during the remainder of the operation, and means for developing a higher compression in the injection cylinder than in the main power cylinder, whereby the mixture enters the injection cylinder at high velocity so that it is thoroughly atomized and is discharged into the main power cylinder with intense turbulence before the spark occurs therein.

2. An internal combustion engine comprising a crank shaft, a main power cylinder and an injection cylinder with a port connecting their upper ends, pistons for said cylinders operatively connected to said crank shaft, an intake port for the injection cylinder, means for supplying a rich fuel mixture to said intake port, a sleeve valve encircling the injection piston within its cylinder and operable to close said intake port except during the latter part of the intake stroke and to close the port connecting the cylinders during the intake stroke and the greater part of the compression stroke, leaving it open during the remainder of the operation, means for supplying air to the main power cylinder during the intake stroke, and means for developing a higher compression in the injection cylinder than in the main power cylinder.

3. An internal combustion engine comprising a main power cylinder and piston, means for charging said cylinder with air, a spark plug at one side of said cylinder, an injection cylinder and piston operable to inject a divergent spray of rich fuel mixture from the opposite side of the main power cylinder to and around the spark plug, as the compression in the injection cylinder approaches its maximum, means for supplying the rich mixture to the injection cylinder, and a sleeve valve encircling the injection piston within its cylinder and controlling both the admission of said mixture to the injection cylinder and the timing of the injection into the main power cylinder.

4. An internal combustion engine comprising a main power cylinder and piston, means for charging said cylinder with air, a spark plug at one side of said cylinder, an injection cylinder and piston operable to inject a divergent spray of rich fuel mixture from the opposite side of the main power cylinder to and around the spark plug, as the compression in the injection cylinder approaches its maximum, a common crank shaft operatively connected to both pistons, means for delivering the rich fuel mixture to the injection cylinder only near the end of the intake stroke of its piston, whereby it will enter at high velocity and be thoroughly atomized, and a sleeve valve encircling the injection piston within its cylinder and controlling both the timing of the delivery of the mixture to the injection cylinder and its injection into the main power cylinder.

5. An internal combustion engine comprising a main power cylinder and piston, means for charging said cylinder with air, an injection cylinder and piston, means for delivering a rich fuel mixture to the injection cylinder toward the end of its intake stroke, when a high vacuum has been developed therein so that the mixture will enter at high velocity and be thoroughly atomized, means for operating the piston in the injection cylinder to spray the mixture into the main power cylinder with intense turbulence toward the end of the compression stroke, so that it will be easily ignited, and a sleeve valve encircling the injection piston within its cylinder and controlling both the timing of the intake of the charge into the injection cylinder and its injection into the main power cylinder.

6. An internal combustion engine constructed in accordance with claim 5, in which the sleeve valve is operated to maintain communication between the two cylinders during the power and exhaust strokes, so that the injection cylinder also functions as a power cylinder and is exhausted through the main power cylinder.

7. An internal combustion engine comprising a main power cylinder and a smaller injection cylinder which also serves as a power cylinder, a communication port between the upper ends of the cylinders, pistons reciprocable in the respective cylinders, spark ignition means in the main power cylinder, an intake port for the injection cylinder, means for supplying rich fuel mixture to said intake port, mechanical means closing said intake port except when the smaller piston is near the end of its intake stroke, whereby the rich mixture enters the small cylinder at a high velocity so that it is completely atomized, means for charging the large cylinder with air alone, means for closing said communication port at the beginning of the intake stroke and opening it toward the end of the compression stroke, and means for developing greater compression in the injection cylinder than in the large cylinder at the time the communication port is opened, the opening of the communication port being timed early enough for the injected mixture to create intense turbulence in the large cylinder before the spark occurs, whereby the explosion pressure is directed against the pistons in both of said cylinders.

8. An internal combustion engine comprising a main power cylinder, means for charging said cylinder with air alone, spark ignition means in said cylinder, a comparatively small injection cylinder, means for building up a high vacuum in the injection cylinder and then admitting a rich fuel mixture thereto, so that the mixture enters at a high velocity and is highly atomized, and means for subsequently compressing the rich mixture in advance of the compression in the main power cylinder and then starting the injection of the mixture into the latter in advance of the maximum compression of the main cylinder to create intense turbulence in the main cylinder before the spark occurs, whereby the explosion pressure will be developed in both cylinders.

9. An internal combustion engine comprising a main power cylinder, means for charging said cylinder with air alone, a comparatively small injection cylinder, spark ignition means located at the extreme side of the main power cylinder and directly opposite to the small injection cylinder, pistons for the respective cylinders, a common crank shaft operatively connected to both pistons, means for building up a high vacuum in the injection cylinder and then admitting a rich fuel mixture thereto, so that the mixture enters at a high velocity and is highly atomized, means for compressing the mixture in advance of the compression in the main power cylinder and injecting the mixture into the latter early enough to create intense turbulence therein before the spark occurs, and means for maintaining a communication between the two cylinders during the power stroke, whereby the injection cylinder also functions as a power cylinder.

10. An internal combustion engine comprising a crank shaft, a main power cylinder, an injection cylinder, pistons for said cylinders operatively connected to said crank shaft, means for charging the main power cylinder with air alone, means for charging the injection cylinder with a rich fuel mixture, a spark plug located at the extreme side of the main power cylinder and directly opposite to the small injection cylinder, means for compressing and injecting the rich mixture into the main power cylinder before the compression is at its maximum in the main power cylinder, thereby setting up a turbulence in and around the spark plug preceding ignition, and means for maintaining communication between the two cylinders throughout the compression and exhaust strokes, whereby the injection cylinder also functions as a power cylinder and is exhausted through the main cylinder.

11. An internal combustion engine comprising a large cylinder and a small cylinder, pistons operating in the respective cylinders, a common crank shaft operatively connected with the pistons so that the small piston reaches upper dead center position in advance of the large piston, an intake port to the large cylinder, a mechanically operated valve admitting air alone to the large cylinder through said port, a communication port between the upper ends of the cylinders, an intake port near the lower end of the small cylinder, means for supplying a rich fuel mixture to the small cylinder intake port, means for opening the communication port during the compression stroke while the compression is higher in the small cylinder than in the large one, whereby a high turbulence is created as rich fuel mixture from the small cylinder is mixed with the air in the large cylinder, spark ignition means for igniting the mixture in the large cylinder during said high turbulence, throttle valves controlling the charges supplied to the respective cylinders, and interconnected means for opening and closing said throttle valves in unison.

12. An internal combustion engine comprising a large cylinder and a small cylinder, pistons reciprocable in the respective cylinders, a common crank shaft operatively connected with the pistons in such a manner that the small piston reaches upper dead center position in advance of the large piston, an intake port to the large cylinder, a mechanically operated valve admitting air alone to the large cylinder through said port, a communication port between the upper ends of the cylinders, an intake port near the lower end of the small cylinder, means for supplying a rich fuel mixture to the small cylinder intake port, a sleeve valve encircling the small piston and having one port that opens and closes the communication port and another port that opens and closes the rich fuel intake port to the small cylinder, mechanical means connected with the crank shaft for operating said sleeve valve successively to close the communication port approximately at the same time that the intake port to the large cylinder is opened, later during the suction stroke to open the rich fuel mixture port to the small cylinder and subsequently close the same, then during the latter part of the compression stroke to open the communication port at a time when the compression is greater in the small cylinder than in the large one, whereby rich unignited fuel mixture is forced from the small cylinder through said communication port into the large cylinder, and sparking means for subsequently igniting the mixture at a point to the extreme side of the main power cylinder and directly opposite to the small cylinder.

MARION MALLORY.